(12) United States Patent
Buchanan

(10) Patent No.: US 10,046,300 B2
(45) Date of Patent: Aug. 14, 2018

(54) MEMBRANE PLASMA REACTOR

(71) Applicant: Walter Riley Buchanan, Olathe, KS (US)

(72) Inventor: Walter Riley Buchanan, Olathe, KS (US)

(73) Assignee: Ion Inject Technology LLC, Lenexa, KS (US)

( * ) Notice: Subject to any disclaimer, the term of this patent is extended or adjusted under 35 U.S.C. 154(b) by 0 days.

(21) Appl. No.: 15/371,445

(22) Filed: Dec. 7, 2016

(65) Prior Publication Data

US 2017/0165630 A1   Jun. 15, 2017

Related U.S. Application Data

(60) Provisional application No. 62/264,965, filed on Dec. 9, 2015.

(51) Int. Cl.
```
B01J 19/08      (2006.01)
B01J 19/24      (2006.01)
H05H 1/24       (2006.01)
```

(52) U.S. Cl.
CPC .......... *B01J 19/088* (2013.01); *H05H 1/2406* (2013.01); *B01J 2219/0811* (2013.01); *B01J 2219/0875* (2013.01); *B01J 2219/0877* (2013.01); *H05H 2001/2412* (2013.01)

(58) Field of Classification Search
None
See application file for complete search history.

(56) References Cited

U.S. PATENT DOCUMENTS

| | | | |
|---|---|---|---|
| 4,283,291 A | 8/1981 | Lowther | |
| 4,399,016 A | 8/1983 | Tsukada | |
| 5,311,419 A | 5/1994 | Shires | |
| 5,387,842 A | 2/1995 | Roth et al. | |
| 5,399,832 A | 3/1995 | Tanisaki et al. | |
| 5,414,324 A | 5/1995 | Roth | |
| 5,872,426 A | 2/1999 | Kunhardt et al. | |
| 5,900,103 A | 5/1999 | Tomoyasu et al. | |
| 5,959,412 A | 9/1999 | Ushijima | |
| 6,005,349 A | 12/1999 | Khnhardt et al. | |
| 6,105,518 A | 8/2000 | Robson et al. | |
| 6,118,218 A | 9/2000 | Yializis et al. | |
| 6,147,452 A | 11/2000 | Kunhardt et al. | |
| 6,170,668 B1 * | 1/2001 | Babko-Malyi ......... | B01D 53/32 209/127.1 |
| 6,208,529 B1 | 3/2001 | Davidson | |
| 6,429,400 B1 | 8/2002 | Sawada | |
| 6,433,480 B1 | 8/2002 | Stark et al. | |

(Continued)

OTHER PUBLICATIONS

"International Search Report and Written Opinion", International Application No. PCT/US2016/053919, dated Dec. 23, 2016.

(Continued)

*Primary Examiner* — Kishor Mayekar
(74) *Attorney, Agent, or Firm* — Law Office of Mark Brown, LLC; Mark E. Brown

(57) ABSTRACT

A system for performing liquid treatment using ionized gas comprises a plasma membrane reactor. The plasma membrane reactor includes a gas zone, and ion membrane along with electrodes to create a plasma. The membrane allows ions to pass through and contact the liquid thereby treating the liquid.

6 Claims, 4 Drawing Sheets

(56) References Cited

U.S. PATENT DOCUMENTS

| | | |
|---|---|---|
| 6,441,553 B1 | 8/2002 | Yializis |
| 6,489,585 B1 | 12/2002 | Nakamura et al. |
| 6,633,109 B2 | 10/2003 | Falkenstein |
| 6,664,737 B1 | 12/2003 | Berry et al. |
| 6,773,335 B2 | 8/2004 | Yanobe et al. |
| 6,818,193 B2 | 11/2004 | Christodoulatos et al. |
| 6,826,222 B2 | 11/2004 | Hill |
| 6,853,138 B1 | 2/2005 | Park et al. |
| 6,946,793 B1 | 9/2005 | Nelson |
| 7,098,420 B2 | 8/2006 | Crow et al. |
| 7,215,697 B2 | 5/2007 | Hill |
| 7,221,102 B2 | 5/2007 | Kotani et al. |
| 7,273,995 B1 | 9/2007 | Manz et al. |
| 7,399,944 B2 | 7/2008 | Devries et al. |
| 7,507,934 B2 | 3/2009 | Kondou et al. |
| 7,764,140 B2 | 7/2010 | Nagarkatti et al. |
| 8,089,026 B2 | 1/2012 | Sellers |
| 8,093,758 B2 | 1/2012 | Hussman |
| 8,542,076 B2 | 9/2013 | Maier |
| 8,633,782 B2 | 1/2014 | Nagarkatti et al. |
| 8,710,926 B2 | 4/2014 | Nagarkatti et al. |
| 9,106,313 B2 | 8/2015 | Ueki |
| 9,287,800 B2 | 3/2016 | Hruska et al. |
| 9,394,189 B2 | 7/2016 | Hruska et al. |
| 9,419,581 B2 | 8/2016 | McKinzie |
| 9,420,679 B2 | 8/2016 | Cheung et al. |
| 9,692,392 B2 | 7/2017 | Cabanillas et al. |
| 9,698,748 B2 | 7/2017 | Manssen et al. |
| 9,736,920 B2 | 8/2017 | Smith et al. |
| 2002/0000019 A1 | 1/2002 | Park et al. |
| 2003/0039297 A1 | 2/2003 | Wittle et al. |
| 2003/0067273 A1 | 4/2003 | Benjamin et al. |
| 2004/0084382 A1 | 5/2004 | Ryazanova |
| 2004/0094401 A1 | 5/2004 | Carlow |
| 2004/0183461 A1 | 9/2004 | Kane et al. |
| 2005/0260354 A1 | 11/2005 | Singh et al. |
| 2006/0097811 A1 | 5/2006 | Nakamura et al. |
| 2006/0150911 A1 | 7/2006 | Miyairi et al. |
| 2006/0208650 A1 | 9/2006 | Kondou |
| 2008/0060579 A1 | 3/2008 | Hsieh |
| 2008/0159925 A1 | 7/2008 | Shimizu et al. |
| 2008/0292497 A1 | 11/2008 | Vangeneugden et al. |
| 2009/0153279 A1 | 6/2009 | Chen |
| 2010/0123502 A1 | 5/2010 | Bhutta et al. |
| 2010/0171428 A1 | 7/2010 | Kirchmeier et al. |
| 2010/0219757 A1 | 9/2010 | Benzerrouk et al. |
| 2011/0241798 A1 | 10/2011 | Hong et al. |
| 2011/0284437 A1 | 11/2011 | Johnson et al. |
| 2012/0020844 A1 | 1/2012 | Foret et al. |
| 2012/0250370 A1 | 10/2012 | Taniguchi et al. |
| 2012/0262064 A1 | 10/2012 | Nagarkatti et al. |
| 2013/0194224 A1 | 8/2013 | Lai |
| 2014/0178604 A1 | 6/2014 | Selwyn |
| 2014/0246364 A1 | 9/2014 | Hruska |
| 2014/0246381 A1 | 9/2014 | Buchanan et al. |
| 2015/0022795 A1 | 1/2015 | Coenen et al. |
| 2016/0028311 A1 | 1/2016 | Murakami |
| 2016/0030910 A1 | 2/2016 | Biberger et al. |
| 2016/0194224 A1 | 7/2016 | Buchanan et al. |
| 2016/0197564 A1 | 7/2016 | Buchanan et al. |

OTHER PUBLICATIONS

"International Search Report and Writter Opinion", PCT/US2014/016730, dated Jul. 4, 2015, pp. 1-18.

* cited by examiner

MEMBRANE PLASMA REACTOR

BACKGROUND OF THE INVENTION

Field of the Invention

Embodiments of the current invention relate to plasma reactors and methods and systems that utilize plasma reactors.

Description of the Related Art

Plasma reactors may include at least two electrodes are spaced apart. Typically, a voltage difference is applied to the electrodes by a plasma voltage generator and an electric field is established between them. A stream of gas may be injected into the space between the electrodes such that it passes through the electric field. In this invention one or both of these electrodes may or may not be dielectrically isolated. Exposure to the electric field generally ionizes the gas and creates a plasma. The present invention may use a permeable or semi-permeable membrane which may be placed between the first and second electrodes. The first electrode and the membrane may be placed in a housing in a manner that allows gas or ionized gas to flow between the first electrode and the membrane and be in contact the membrane. The opposite side of the membrane may be exposed to a liquid. The gas or ionized gas may penetrate into and through the membrane and into the liquid. The second electrode may be placed on the other side of the membrane in a liquid such as water (or some other liquid) and in somewhat close proximity to the membrane, then the liquid may contact the membrane on the side away from the first electrode. Depending on the electrical characteristics of the liquid, it may act generally as a second electrode. The gas in the membrane may become ionized and form a plasma in, or around the membrane. If the membrane is permeable to the gas or ionized gas, the ionized gas may pass through the membrane and may come in contact with the liquid. This may allow the ionized gas to enter the liquid. In cases where the membrane is permeable to the gas, a portion of the gas may also enter the liquid in a non-ionized condition. In this manner, ionized gas may become associated with or injected into the liquid. Plasma injection into liquid may be utilized for applications such as: in-line liquid hydrocarbon fuel reforming for hydrogen enrichment to improve the fuel economy of internal combustion engines; nitrogen fixing by direct nitrogen ion injection into water; destruction of high molecular weight hydrocarbons (proteins and pharmaceuticals) in drinking water by injection of oxygen; ammonia/nitrate sequestering for treatment of high nitrate content water; demineralization (water softening) for consumer and industrial markets; disinfecting water; and other similar applications. In some previous reactors that utilize gas and liquid, a gas zone was created above the liquid and the plasma was created in this gas zone. This could be accomplished using a eductor or a laminar flow arrangement. This caused the area of the plasma generation to be limited to a relatively small area as the gas zone had to be well controlled. In addition, the liquid in previous designs had to be filtered to remove large particles and some contaminates. This new and novel design allows the liquid to be in direct contact with the membrane and therefore the liquid does not have to be (but can be if desired) flowing, nor do large particles have to be removed and the surface area for ion injection into the liquid can be increased while the design is simplified. In this invention the major limits to size may be the membrane size. In this manner the reactor in this patent can be part of a flowing liquid such as in a piping system, or simply added to a non-flowing water system such as a lake, swimming pool, or washing machine.

SUMMARY OF THE INVENTION

A first embodiment of the current invention provides a membrane plasma reactor comprising a housing, an electric field generator, a membrane consisting of one or more layers of material, and may include a first and second and possibly more electrodes. The first electrode may be enclosed in a dielectric material and enclosed in the housing. The first electrode may be spaced away from the membrane forming a gap which allows gas to pass between the first electrode and the membrane. The membrane may form one side of the housing such that a first face of the membrane may be on the inside of the housing facing the electrode and a second face may be on the outside of the housing. The first electrode side away from the dielectric may be covered with a potting compound to seal the electrode. The housing may include an internal chamber which may allow gas to enter the reactor through a gas inlet tube and contact the first face of the membrane on the inside of the housing. The housing may have an optional gas outlet tube so that gas may be allowed to exit the internal chamber. Using the inlet and optional outlet tubes may allow low purity gas to be ionized in the chamber and using a selective membrane to select an ion species (such as ionized oxygen) to be passed through the membrane to the liquid. The reactor may be intended to be partially or completely submerged in a liquid such that the first face of the membrane may be partially or completely in contact with the liquid when the reactor is submerged or partially submerged in said liquid. The electric field generator may be connected to the first electrode and a spaced apart second electrode and may generate an electric field there between.

The first electrode may be composed of electrically conductive material and may be isolated from the internal chamber by a dielectric material to electrically isolate the conductive layer from the gas and first side of the membrane inside the housing. The first electrode may be connected to the plasma voltage generator via a conductive element.

This dielectric insulating layer may be in contact with, or in close proximity to the membrane. A second electrode may be generally outside the housing and in contact with the liquid that the reactor may be partially or completely submerged in or is otherwise in contact with. In other embodiments the second electrode may also be dielectrically isolated from the liquid.

A second embodiment may include a gas dispersion membrane layer which may replace the gas zone (see FIG. 3) such that said membrane lays between the dielectric and the Ion membrane and facilitates gas dispersion between these layers. In certain instances this may facilitate an easier method of assembling the reactor such that good tolerance may be maintained between the various layers. In addition, in other embodiments, this layer may consist of a material such as $Al_2O_3$ or similar materials which may allow the electric field generated between the electrodes to be closer to the Ion membrane.

In cases where more layers of membrane materials are used, it may be the case that one or more layer may be porous to the gas or porous to the ionized gas that is to be used in the reactor. These membrane materials may have electrical properties which may enhance the process. A first layer of the membrane may consist of a porous, electrically insulating material such as Alumina which may allow the electrical field to spread laterally across the surface of the second material toward the liquid. A second layer of the membrane which may be closer to the liquid could consist of a material that encourages the electric field to be more in the gas such as $TiO_2$ thereby encouraging a plasma to form in the gas. There are several such films of each type known in the industry.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
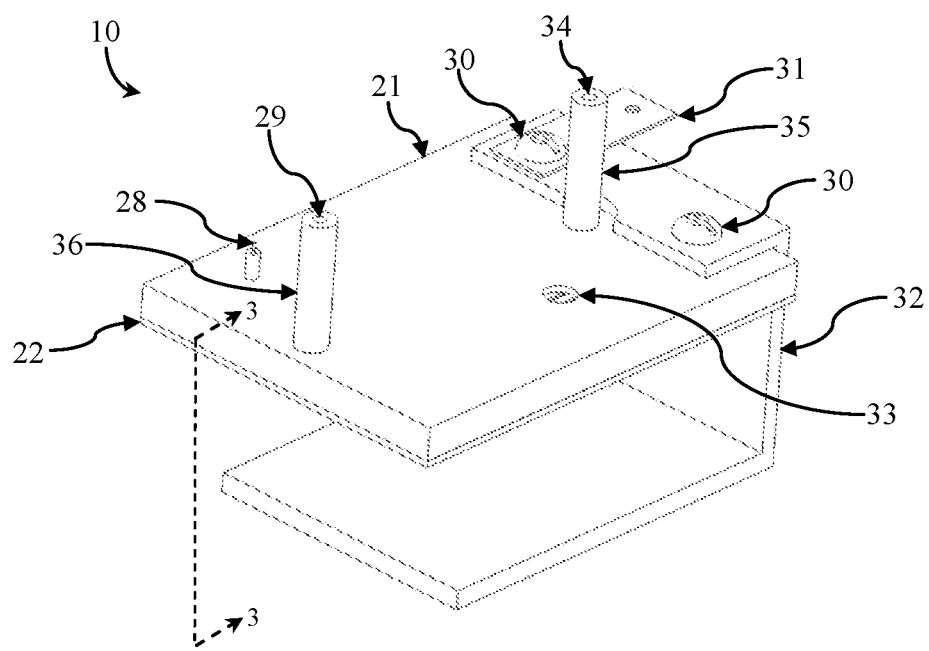
FIG. 1 is an isometric view of a membrane reactor constructed in accordance with various embodiments of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention may be implemented. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
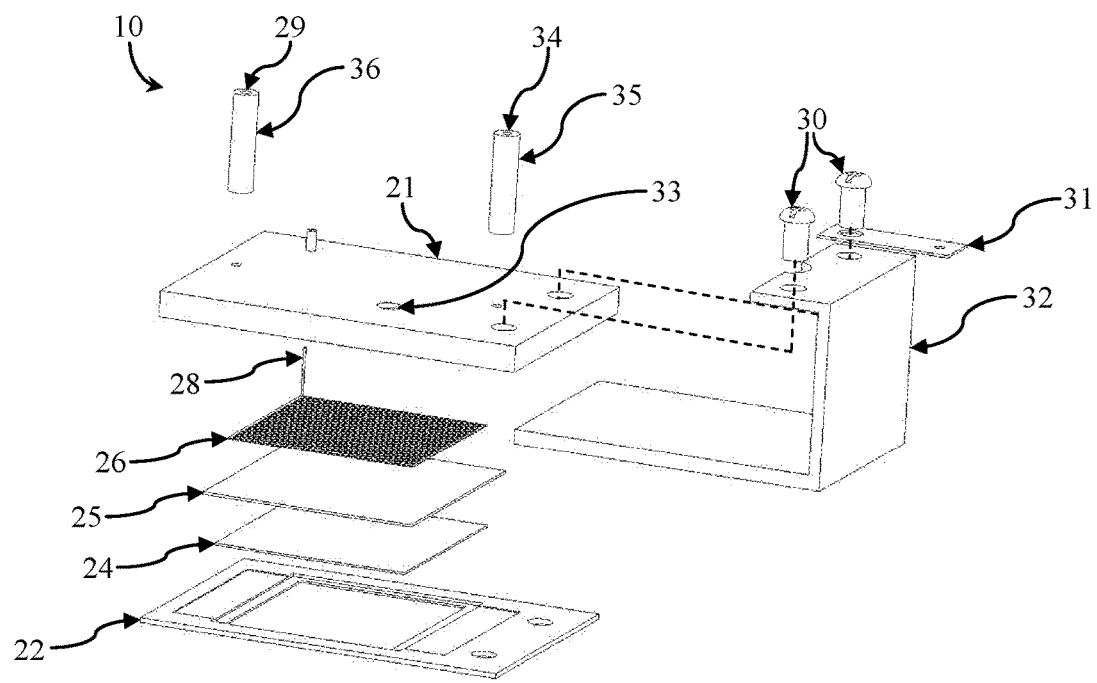
FIG. 2 is an exploded view showing one implementation of a membrane reactor.
Figure 3:
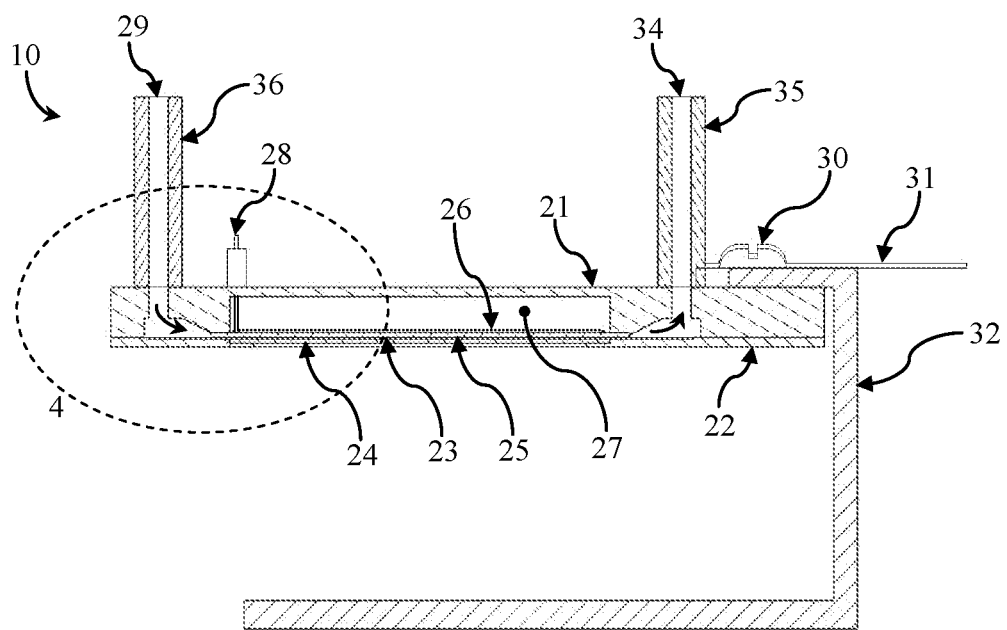
FIG. 3 is a sectional view of the membrane reactor of FIG. 1 cut along line 3-3.
Figure 4:
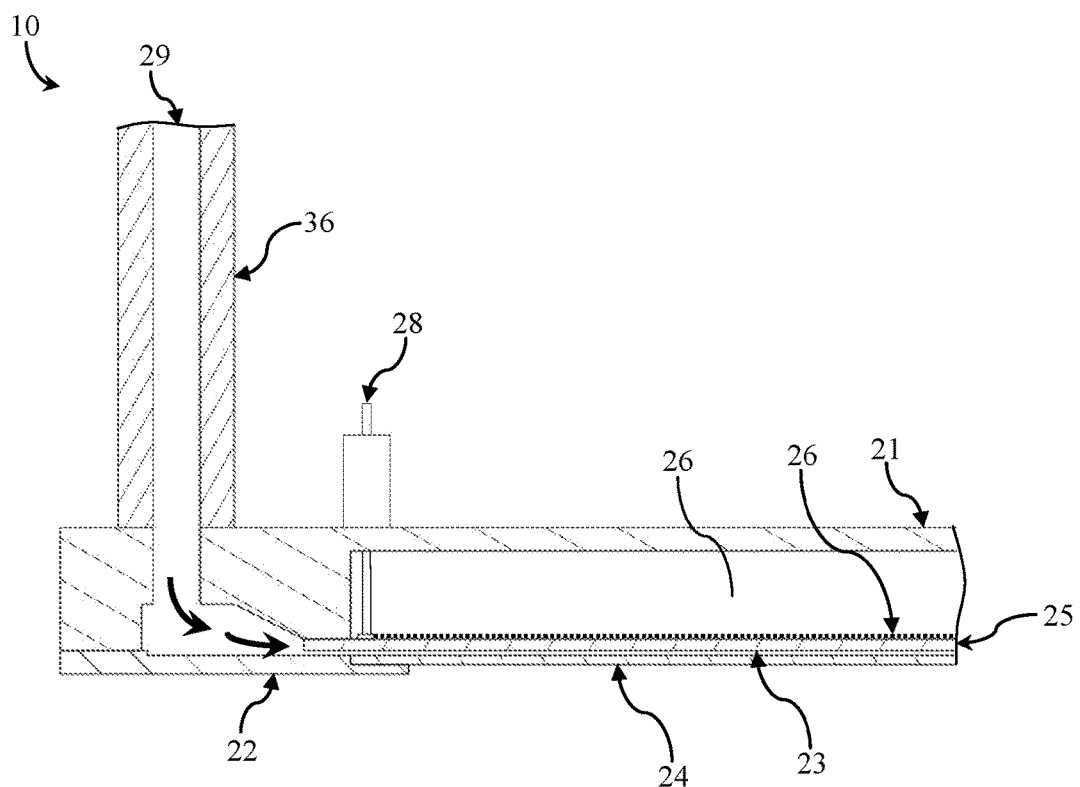
FIG. 4 is a sectional view showing greater detail of the membrane reactor of FIG. 3 in the area designated by the oval numbered 4 of FIG. 3.

Referring to FIGS. 1-4, a membrane reactor 10, constructed in accordance with at least a first embodiment of the current invention, is shown. The reactor 10 generally receives a gas as an input. The reactor is generally partially submerged or completely submerged in a liquid such that the ion membrane 24 and second electrode 32 are in contact with said liquid. The gas in the gas zone 23 may be ionized to form a plasma which is injected through the ion membrane 24 and into the liquid to create an effluent or product. The reactor 10 broadly comprises an upper housing 21 which has a gas inlet port 29 and gas inlet nozzle 36 and an optional gas outlet port 34 and gas outlet nozzle 35, a potting compound fill hole 33, areas to mount the first electrode and dielectric, and areas to facilitate the dispersion and exit of gas as it enters the reactor and move between the dielectric 25 and ion membrane 24. A lower housing 22 which has areas to mount the Ion membrane 24, and areas to facilitate the movement of gas between the dielectric 25 and ion membrane 24. An ion membrane 24 which may be porous to gas, and/or ionized gas such that ions created by the electric field can move from the gas zone 23 toward the liquid. A first electrode 26 and a dielectric 25 mounted onto the upper housing such that the first electrode 26 is dielectrically isolated from the gas zone. An optional chamber above the first electrode 26 which may be filled with potting compound to insure the first electrode 26 remains electrically isolated from any liquid that is on or around the upper housing 21. A first electrode connection 28 which may be connected to a plasma voltage generator or sufficient voltage to ionize the gas in the gas zone 23 and in the ion membrane 24, or in cases where there is no gas zone, only in the membrane. A second electrode connection 31 to connect the second electrode 32 to the plasma voltage generator and provide electrical connection to the second electrode 32. A plasma voltage source (not shown) connected to the first and second electrodes capable of ionizing the gas in the plasma zone and/or the ion membrane.

Positional and directional terms, such as "upper", "top", "lower", "bottom", and the like, are used herein to describe various aspects of the current invention as shown in the accompanying figures. While the figures depict the invention in a particular orientation, the invention may be utilized in virtually any orientation. The relationship between the components established by the terms still applies when the invention is utilized in an orientation other than that shown in the figures.

The upper housing 21 and lower housing 22 (together "housings") generally retain the components of the reactor 10, and its shape may be adapted to the system in which it is implemented. The housings may include additional components or flanges that adapt the plasma reactor 10 to the system in which it is implemented. In some embodiments, the housings may have alternate shapes such as a elongated rectangle to facilitate different applications. In an exemplary embodiment, the housings have a generally square shape. The housings may also include cutouts along an outer surface of the sidewalls to allow for fasteners to assemble the housings. In addition, the upper housing 21 may include a gas inlet nozzle 36 and inlet port 39 and an optional gas outlet nozzle 35 outlet port 34. The gas outlet port may not be required when high purity or other gasses are used and expected to be fully consumed by the process. These ports may also be on the lower housing 22 when the design is more convenient this way. The housings and membranes may be constructed from metals, plastics, ceramics, or the like.

The first electrode 26 and second electrode 32 are connected to a plasma voltage generator (not shown in the drawings) and may result in an electric field being generated there between. Depending on the liquid being processed, the liquid may transfer the electric field to the surface of the ion membrane 24 from the second electrode 32 thereby reducing the voltage required to initiate a plasma voltage. In cases where the liquid does not transfer the field, the second electrode must be placed closer to the ion membrane 24 and/or the plasma voltage generator must supply a higher voltage to initiate the plasma. There can be more first electrodes or second electrodes as the design requires to lower the plasma initiation voltage or otherwise modify the electrical characteristics of the reactor.

The dielectric element 26 generally provides an insulating gap across which at least a portion of the electric field is established. The dielectric element 26 may be planar, although other shapes are possible, and may be constructed from insulating dielectric material such as ceramics, polymers, or the like. An upper surface of the dielectric element 26 may be coupled to a lower surface of the upper housing 21. In addition, the first electrode 26 may bonded, glued, or otherwise affixed to the upper surface of the dielectric element 26.

The ion membrane 24 is affixed to the lower housing. The lower housing 21 may be recessed where the ion membrane 24 is such that a gap is created between the dielectric 26 and the ion membrane 24. In some applications, a second porous membrane may be added between the dielectric and the ion membrane 24 to facilitate structural integrity and maintain good tolerance between the dielectric 25 and ion membrane 24. In addition this second porous membrane may facilitate the electric field spreading toward the ion membrane thereby reducing the voltage required to initiate a plasma. The ion membrane 24 generally provides a path for ionized and in some cases non-ionized) gas to move from the gas zone to the liquid.

The characteristics of the electric field may be controlled by the external plasma voltage generator which may provide DC pulses or AC from 2,000 Volts to greater than 150,000 Volts and are known to those familiar with the art.

Using the example of an oxygen ion injection system into water, the following description may describe how the system 10 would function.

Oxygen gas may be supplied to the gas inlet port 29 which delivers the gas to the gas zone 23. The gas would travel across the gas zone 23 and some may exit the gas outlet port 34.

The reactor would be submerged, or partially submerged in water (or water based liquids) such that water would be contacting the ion membrane and second electrode.

The plasma voltage supply may supply a voltage to the first electrode connection 28 which is connected to the first electrode 26 and second electrode connection 31 and second electrode 32 and create an electric field across the gas zone of sufficient intensity to initiate a plasma. As the oxygen moves through the gas zone 23 gas may be ionize and form a plasma. Ionized ions would move toward the ion membrane due to the electrical differential and move through the ion membrane toward the water. Ions would then enter the water creating treated water. The treated water may be released into the environment or may undergo further processing.

The system 10 described herein provides the following features and advantages. When utilized for water treatment or water purification, the system 10 generates short-lived but highly active oxygen radicals that are extremely reactive and capable of rapidly damaging cell membranes as well as proteins and/or lipids in viruses. The system 10 may also generates longer lived ozone molecules that attack organics and damages cell membranes and have a more lasting effect. The exposure of the water film to the very high electric field (on the order of 50,000V/cm) in the area between the ion membrane and second electrode may enable an electroporation mechanism to damage cell walls of microbes passing through it via the liquid and aids in sterilization. This electroporation may happen with or without the plasma being energized. In addition, the expansion of the gas when the plasma is energized creates high intensity ultrasonic energy in the gas which is directly coupled to the liquid and is intense enough to enable ultrasonic lysing of cell membranes. Since the pulse rise times are very short, sound travels through liquid very well, the layer is very thin, and the some energy wave in the liquid is significant throughout the layer and will aid destruction of cellular bodies. Furthermore, the ability of the system 10 to modify the high voltage pulses in such a way as to accentuate one or more of these features may allow some degree of tailoring of the process to a particular need, such as enhancing one treatment or purification mechanism vs. another.

These embodiments may be part of a larger system, part of a piping system which may allow liquid to flow past the system 10 to be treated as it flows, or part of a system that allows the liquid in a contained environment (such as a lake or a washing machine) to be treated.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A plasma membrane reactor comprising:
   a housing including a dielectrically isolated first electrode, a gas zone including a gas and internal to the housing;
   an ion membrane with one surface bounding the gas zone and a second surface external to the reactor;
   a dielectric element with a first surface and an opposing second surface and positioned at a top of the gas zone, wherein the dielectrically isolated first electrode is coupled to the first surface; and
   an electric field generator including the dielectrically isolated first electrode and a spaced apart second electrode configured to generate an electric field therebetween, the dielectrically isolated first electrode having a shape of roughly the same as the dielectric element and the spaced apart second electrode together producing the electrical field.

2. The membrane reactor of claim 1, further comprising a gas inlet coupled to the gas zone.

3. The membrane reactor of claim 1, further comprising a gas outlet coupled to the gas zone.

4. The membrane reactor of claim 1, wherein the membrane reactor is configured to be partially or completely submerged in a liquid such that the liquid is in contact with the ion membrane.

5. The membrane reactor of claim 4, wherein the electric field generator ionizes the gas to create a plasma in the ion membrane adjacent to the liquid.

6. The membrane of claim 5, wherein ions created by the plasma move through the ion membrane toward the liquid.

* * * * *